D. COX.
BEE-HIVE.
No. 171,214. Patented Dec. 21, 1875.
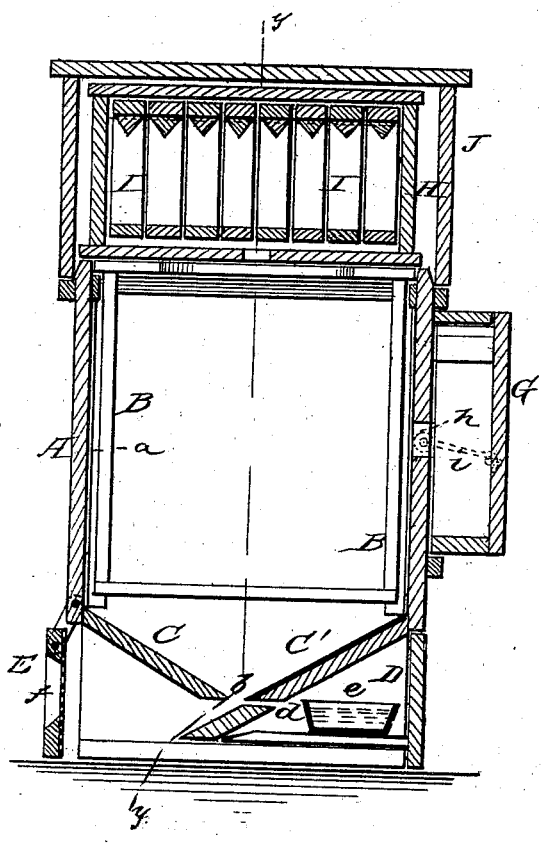
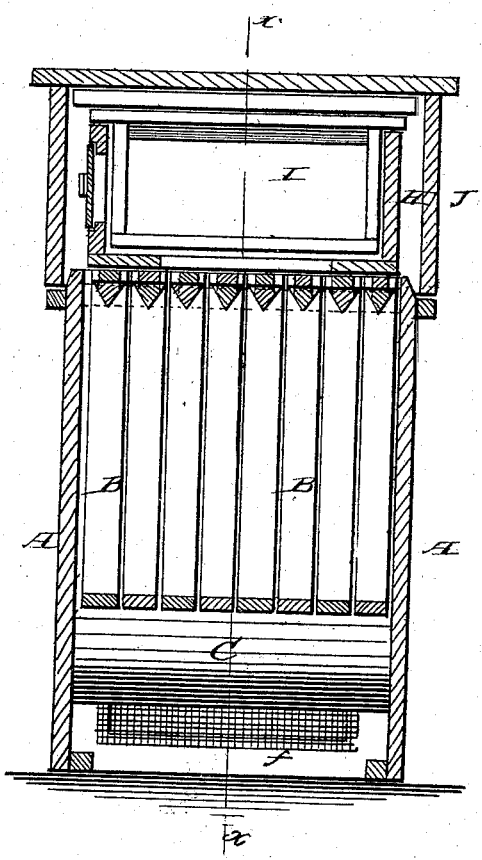
WITNESSES:
INVENTOR:
Daniel Cox
per.
C. H. Watson & Co.
ATTORNEYS.

UNITED STATES PATENT OFFICE.

DANIEL COX, OF KINGSTON, MISSOURI, ASSIGNOR OF ONE-HALF HIS RIGHT TO A. F. McCRAY, OF SAME PLACE.

IMPROVEMENT IN BEE-HIVES.

Specification forming part of Letters Patent No. 171,214, dated December 21, 1875; application filed May 18, 1875.

*To all whom it may concern:*

Be it known that I, DANIEL COX, of Kingston, in the county of Caldwell and State of Missouri, have invented certain new and useful Improvements in Bee-Hives; and I do hereby declare that the following is a full, clear, and exact description thereof, which will enable others skilled in the art to which it pertains to make and use the same, reference being had to the accompanying drawings, and to the letters of reference marked thereon, which form a part of this specification:

The nature of my invention consists in the construction and arrangement of a bee-hive, as will be hereinafter more fully set forth.

In the annexed drawing, Figure 1 is a vertical section through the line $x\ x$, Fig. 2, and Fig. 2 is a vertical section through the line $y\ y$, Fig. 1.

A represents the case of the hive, made square or rectangular, of any suitable dimensions, its sides being united together by means of angular or L-shaped strips $a\ a$, of zinc. Near the upper edges, on two opposite sides of the hive A, are strips or cleats for the support of the comb-frames B B, which may be constructed in any of the known and usual ways, with V-shaped comb-guides. Under the comb-frames B is the bottom of the brood-chamber, formed of two inclined parts, C and C′, extending, respectively, from the front and rear sides inward and downward, as shown in Fig. 1, the part C′ extending beyond the inner lower edge of the part C, and forming the alighting-board, with the bee-entrance $b$. The board C′ is lined with zinc, so as to prevent the moth from passing up the same into the hive, but causes them to pass through an aperture, $d$, into a drawer, D, under the bottom C′, in which drawer is placed a pan, $e$, with suitable bait to draw the moth. The aperture $d$ extends the entire width of the hive, and is placed below the bee-entrance $b$, so that the moth are all conducted into the moth-trap before they reach the bee-entrance, and do not, therefore, enter the hive at all, and by extending the aperture $d$ the entire width of the hive the moth pass directly into the moth-trap, whatever part of the incline they pass up. At the front of the hive is a hinged door, E, with wire screen, $f$, which door is to be closed in the winter-time, and still afford sufficient ventilation for the bees. Outside of the hive is attached a removable box, G, by means of hooks $i\ i$, to form a bee-feeder, a passage, $h$, being made from the brood-chamber into the same. In the bee-feeder G is to be placed a comb-frame from the honey-box. The top bars of the comb-frames B are so constructed as to form suitable openings for the passage of the bees from the brood-chamber to the honey-box H, placed on top of the frames. In this honey-box are placed a series of comb-frames, I, of ordinary construction; but the honey-box may be used without these frames, if desired. The honey-box and top of the hive are closed and covered by a cap, J, which rests on cleats fastened to the sides of the hive A.

Having thus fully described my invention, what I claim as new, and desire to secure by Letters Patent, is—

The drawer D, forming a moth-trap, in combination with the moth-entrance $d$, arranged below the bee-entrance $b$, and extending the entire width of the hive, all arranged and constructed substantially as and for the purpose set forth.

In testimony that I claim the foregoing as my own I affix my signature in presence of two witnesses.

DANIEL COX.

Witnesses:
H. J. CHAPMAN,
MARTIN WILSON.